Patented Feb. 26, 1929.

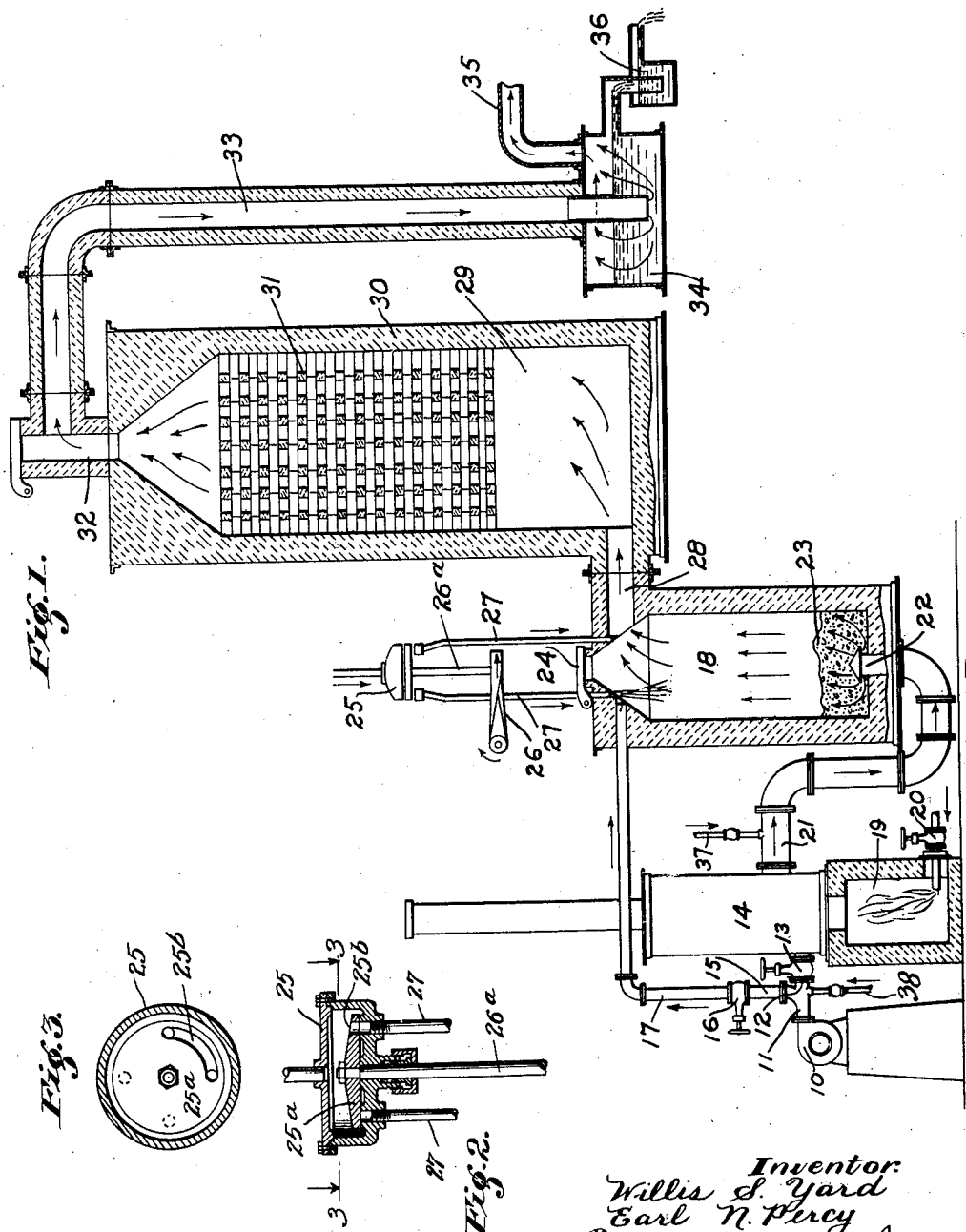

1,703,506

UNITED STATES PATENT OFFICE.

WILLIS S. YARD AND EARL N. PERCY, OF SAN FRANCISCO, CALIFORNIA.

CONTINUOUS OIL-GAS PROCESS.

Application filed December 1, 1924. Serial No. 753,157.

This invention relates to oil gas manufacture, and particularly pertains to a continuous oil gas process and apparatus.

In localities where crude oil is plentiful, or where its use is economically advantageous over coal, it is common to manufacture gas from oil for municipal and other purposes, the gas thus produced being commonly known as oil gas, as distinguished from coal gas and water gas, although water gas enters largely into the manufacture of modern oil gas.

A typical oil gas analysis resulting from a present day well known type of apparatus for municipal purposes is represented by the following:

Gallons per M cubic feet of gas generated _____ 7.02

Constituents.

|  | Percentages by volume. |
|---|---|
| $CO_2$ | 5.4 |
| $C_6H_6$ | 1.2 |
| $C_nH_2$ | 2.9 |
| $O_2$ | 0.3 |
| $CO$ | 13.2 |
| $H_2$ | 47.5 |
| $CH_4$ | 26.1 |
| $N_2$ | 3.4 |
| Specific gravity | 0.485 |
| B. t. u. (calculated) | 553 |
| B. t. u. (observed) | 550 |

*The intermittent process of oil gas manufacture.*

The intermittent process of making gas embodies two antithetical ideas—a heating period and the gas making period. During the heating period the temperature of the apparatus is brought up to the gas making stage, usually of high incandescence, whether the interior work of the apparatus is carbon-coated checkerbrick, or other carbon-coated refractory material. When the apparatus is heated to a sufficient temperature, the apparatus is, of course, filled with products of combustion, and it is therefore necessary to arrest combustion and purge the apparatus of these products of combustion before entering upon the gas making period. The heating period having come to an end, and the apparatus being purged of the deleterious products of combustion, which, of course, are valueless as an illuminant, or as a heating gas, oil and steam, in a well known manner, are then introduced into the highly heated apparatus; the steam serving the double function of atomizing the oil and of producing water gas.

The gas from the oil and steam is then passed through the apparatus and fixed, and thence conveyed through suitable washers and scrubbers to the holders and mains.

During this gas making period the temperature of the apparatus is somewhat reduced, due to the atomization of the liquid oil and the introduction of steam, which is of relatively low temperature compared with the interior incandescent temperature of the generator apparatus. As the temperature of the apparatus falls, the gas made changes somewhat both in quality and quantity, as the gas will be relatively thin or lean while the apparatus is at high temperature and relatively rich or heavy as the temperature falls.

During this period of temperature drop in gas making by the usual intermittent method, the generator brick cools somewhat and it then becomes necessary to discontinue the gas making period and again air blast the apparatus. In this period of reblasting and of raising the interior of the generator to the temperature of incandescence, the checkerbrick work is reheated and the temperature of the apparatus is once more raised to a point creating a favorable condition for gas making, after which the process described is repeated. This is what is known as intermittent process of making gas from oil.

*Method of making producer gas.*

If a shallow bed of fuel, especially coke, be blasted with air, the usual products of combustion will be $CO_2 + H_2O$ and the nitrogen of the air which enters and leaves an inert gas.

If a deep bed of coal be blasted with air, the products of combustion are $CO$, $H_2$, distilled hydrocarbons and nitrogen.

If a deep bed of coke be blasted with air, together with a small amount of steam, the products of combustion will be $CO_2$, $H_2$, distilled hydrocarbons, a certain amount of $CO$, and nitrogen.

This is the gas usually referred to as producer gas. This gas has an average calorific value of 150 B. t. u. per cubic foot and is useful only for industrial purposes, being worthless for domestic uses, because of the enormous distributing system necessary and the low temperature of the flame.

We have referred to producer gas because in our practice we have made use, for matters of convenience, of a gas producer in our apparatus, although manifestly, our process is not necessarily limited to an initial form of producer gas, as such.

It will be understood that acceptable commercial gas for industrial and domestic use has been more or less standardized between 400 and 600 B. t. u. per cubic foot, because gas within these limitations burns acceptably in industrial and domestic appliances, and also because such gas may be transmitted economically through the usual distribution systems.

In the present invention we have aimed to produce an apparatus in which the gas making process may be carried on continuously. This, of course, can only be done by means and the mode of procedure which makes it possible to maintain the solid gas-making elements in the generator at a uniform gas making temperature while not at the same time introducing into the apparatus prohibitive quantities of anything in derogation, or what may be considered a diluent of a high grade commercial gas.

This invention relates particularly therefore to a continuous oil gas making process which we consider an improvement over the customary intermittent methods of oil gas making. More especially, the process relates to the continuous generation of a mixture of oil gas and producer gas by the decomposition of oil in a producer, the deposit of carbon from the oil in the producer, the supplying of additional heat necessary by preheating the air used in the producer and the fixing of the vapors and gases in a checkerwork secondary chamber which supplies the necessary contact surface for the reactions and heat exchanges among the gas constituents, said reactions being energized by the heat in the gases and preheater.

Our process realizes all the advantages of continuous operation, such as, continuous maintenance of optimum conditions, minimum of attention necessary, great reliability, flexibility of gas production and gas quality, accurate adjustment of the plant to the current needs for gas, reduction in sizes of purifiers and scrubbing equipment, elimination of smoke or objectionable fumes, elimination of lampblack together with a minimum production of tar, and a controllable production of hydrocarbon oils.

In addition to the above advantages, peculiar to continuous operation, we realize a very great economy; for example, a 500 B. t. u. gas has been produced with not more than four and one-half gallons of 16 degrees Baumé gravity, heavy fuel oil per thousand cubic feet, without production of lampblack or naphthalene. This represents a saving of two or two and one-half gallons per thousand cubic feet over present practice.

The invention is illustrated by way of example in the accompanying drawing, in which:

Figure 1 is a diagrammatical view in vertical section and elevation showing one form of apparatus by which the present invention may be practiced. Figure 2 shows a central vertical section view of the mechanism for injecting oil into the producer. Figure 3 shows a section taken on the line 3—3 of Figure 2.

Referring more particularly to the drawing, the apparatus consists of a blower 10, here indicated as a rotary blower which is connected with an air inlet pipe 11. The air inlet pipe 11 is provided with two connections, a portion 12 extending through a valve 13 to an air preheater 14, and a pipe 15 connected with a valve 16 and controlling the flow of air to a pipe 17 through which the air may by-pass the preheater and directly enter the top of a producer 18. This producer is an apparatus commonly understood as being used in making producer gas. The preheater 14 is fitted with a firebox 19 supplied with a suitable source of heat, as the oil burner 20. A hot air conduit 21 is connected with the preheater and conducts a stream of air to the bottom of the producer where it passes into the producer through an inlet 22 having a hood. This hood is covered by a bed of carbonaceous material as indicated at 23. The top of the producer is fitted with a removable cover 24. Oil is supplied to producer at alternate points by means of a manifold, 25, to which is connected a plurality of pipes, 27. Admission of oil from manifold to the pipes is controlled by a rotatable disk, 25$^a$, having an aperture, 25$^b$, to register with the pipes, 27. This disk is driven by a shaft, 26$^a$, connected with suitable operating means, 26.

The top of the producer is in communication through a conduit 28 with the bottom of the secondary chamber 29. This secondary chamber is formed with a side wall 30 of refractory material and is preferably filled with checkerbrick work, as indicated at 31, it being understood that during the operation of the apparatus this checkerbrick will be raised to a temperature sufficient to produce incandescence. A gas offtake 32 is connected with the top of the secondary chamber 29 and is in communication with a draw-off pipe 33 leading to a washbox 34. The washed gas may then be conveyed to the suitable storage receptacles through a pipe 35 while the sludge and other residue may pass off from the washbox through trap 36.

The operation of the apparatus is as follows: The producer 18 being half-filled with oil carbon, lampblack, charcoal, anthracite coal, or other suitable fuel, a fire is started. This fire is then blasted with air from the blower 10 and steam delivered through pipes 37 or 38 until producer gas is formed. Secondary air is then admitted through valve 16 and pipe 17, thus supporting combustion of the producer gas and carrying the flame over into the checkerwork chamber 31 of the secondary chamber 29, the checker brick of which begins to rise in temperature. This process is carried on until the temperature of the checkerwork 31 in practice approximates 1,000° to 1,800° Fahr., according to the quality of gas desired. Then the flow of secondary air entering the producer 18 through pipe 17 is discontinued and the oil is injected into the producer through pipes 27.

In the meantime the burner 20 under the preheater 14 maintains a sufficient temperature to insure that the injection of oil through pipes 27 does not reduce the temperature of the checkerbrick 31. When these conditions are balanced and established, an acceptable grade of raw, unwashed commercial gas issues from the offtake pipe 32 in a continuous flow of uniform quality until the plant is closed down. Control of temperatures in the producer 18 is maintained by controlling the temperature of the ingoing air through the preheater 14. These temperatures may also be controlled by varying the amount of steam admitted through pipes 37 and 38, but this will alter the quality of the gas. It will be understood that alterations of temperature also change the quantity of gas. The steam may be admitted at any stage in the operation, inasmuch as this is a continuous system.

The quantity of gas is controlled by varying the speed of the air blower 10 and then varying other conditions proportionately in order to maintain the same temperature in the checkerbrick 31 and the same quality of gas. The steam and oil are, of course, varied proportionately with the amount of air.

The amount of sensible heat developed in a producer is easily calculated and well known to those skilled in the art. This sensible heat is not enough to gasify the necessary amount of oil to enrich the producer gas and raise its calorific value from approximately 150 B. t. u. to the 400 or 600 B. t. u. of acceptable commercial gas.

We are therefore supplying this additional heat as previously described by preheating the air. This preheater may be heated with oil, solid fuel, wood, lampblack, tar, gas, or waste heat. In practice, we use gas and waste heat, since the efficiency of the plant exceeds eighty per cent. and a gas fire requires a minimum of labor.

It is to be understood that steam may or may not be admitted to the producer, and may or may not be preheated. In fact, steam may be admitted with air, or may be admitted separately, according to the kind of gas it is desired to make and the conditions it is desired to maintain in the practical operation of the producer. In practice we usually use superheated steam to increase the concentration of hydrogen, and thus, by the principle of equilibrium, prevent the breaking down of methane into hydrogen and carbon.

In terms of preheating of blast air, we approximate the following kinds of gas.

|  | B. t. u. | Per cent nitrogen |
|---|---|---|
| Without preheating | 375 | 50 |
| 250° Fahr. | 400 | 40 |
| 500° Fahr. | 450 | 35 |
| 750° Fahr. | 500 | 30 |
| 1000° Fahr. | 500 | 25 |

The oil is injected into the top of the producer through a multiplicity of nozzles connected with the manifold 25 by pipes 27. We are aware of experiments of this kind which in most instances have failed because the oil, if atomized, will form lampblack and soot; if injected continuously at one spot, it will extinguish combustion and gradually soak to the bottom of the producer. After experiencing this difficulty in practice, we use a multiplicity of nozzles, injecting the oil through a portion of them only and periodically changing from one portion to another portion.

The net result is that we can accurately control the depth to which the oil and its vapors penetrate into the producer. The oil deposits carbon in the producer, which is acted upon by the air exothermically and the steam endothermically, forming producer gas having considerable sensible heat. The sensible heat, originating in the producer combustion and in the preheater, vaporizes and cracks the oil.

Of course, this carbon bed requires the usual attention of any producer fuel bed to prevent channeling and caking. This attention is afforded in our case by hand poking in the experimental plant, but we contemplate standard automatic mechanical agitating devices for commercial plants.

In addition to the usual attention demanded by all producers, our producer forms cakes of pure carbon under each burner. These cakes must be broken up and separated to prevent fuel bed channeling and plugging, resulting in the production of a poor quality of gas. We find these cakes amenable to hand poking and standard mechanical agitation.

In other words, carbon is deposited by the oil, and the fuel bed is continuously replenished by the carbon from the oil.

This carbon is at first in the form of free carbon and oil. This free carbon and oil then cokes under each burner and finally forms a solid disk of coke across the top of the fuel bed, unless this surface is agitated or broken up by suitable poking, either mechanical or by hand.

We wish to emphasize the three stages of carbon formation in the producer, and the stages of treatment without which such producers are inoperable when reduced to practice.

First—Deposit of free carbon and oil.

Second—Coking and agglomeration of free carbon and oil.

Third—Breaking up of coke in suitably sized lumps by poking.

If oil only is used in producer, the fuel bed gradually increases.

If steam also is used, this increase is lessened and the fuel bed may then be caused to decrease in height by the use of sufficient steam.

The resulting producer gas, oil vapors and oil gas contain sufficient heat to completely crack and gasify the oil vapors, but surface contact and time are needed to cause this reaction. We do not know whether it is due to catalytic action, adsorbent action, absorbent action, or exothermic transfer of heat from gas reactions to the brick and endothermic absorption of heat by other reactions from the brick; but we do know from practice that surface contact completes the reactions and converts the mixture of vapors and gases into acceptable commercial gas, and this without the addition of further heat than is already contained in the gas, provided the brick or other contact surface is first heated to, or above the optimum temperature for the gas desired.

We have also found a decided tendency for the gases and vapors to stratify and for the heavy vapors to sink to the surface of the fuel bed, or to the bottom of the checker work chamber. For this reason we obtained better results by having the gases and vapors at 11 enter the bottom of the checker chamber 31, because they tend to remain until properly cracked to a lower specific gravity. On the other hand, our experiments which enter the gas at the top of the checker chamber 31 showed a decided tendency for the heavy vapors to drop through the checker chamber without complete cracking. Nor would succeeding uptake chambers remedy matters much because of the falling heat gradient and the necessity of cracking the vapors with initial high heat instead of succeeding lower points on the best gradient. If, however, the flow of gas from the producer and through the secondary chamber is in a generally upwardly direction, as shown on the drawing, it may then be followed by succeeding checker chambers because the initial cracking has been sufficient to eliminate the tendency to stratify.

We find one or more checker chambers to be advantageous because of their tendency to bring the gas to exact, unvarying standards after the optimum conditions have been obtained.

In our experiments we have found in a general way that high temperatures produce gases high in hydrogen, low in B. t. u. and a by-product of lampblack. Low temperatures, in a general way, tend to produce gases high in hydrocarbons and of high B. t. u. with a by-product of tar. Still lower temperatures produce a minimum of gas and a maximum of cracked hydrocarbons containing benzol and other light hydrocarbons, including a large percentage of unsaturates.

We therefore consider our process a new and novel means for the cracking of oil into lighter hydrocarbons. We consider that this is a useful phase of our invention because great temperature is available for the cracking of hydrocarbons and we therefore contemplate a further investigation of this phase of our process, and include this phase in our claims. We contemplate carrying our investigations of this phase into higher pressures for the purpose of reducing the percentage of unsaturates by the well known process of equilibrium and the tendency of hydrocarbons to crack to saturates rather than unsaturates under optimum pressures and temperatures.

We will state that commercial gas, or liquid hydrocarbons can be made with a down-drop checker chamber, but not so efficiently as with an uptake checker chamber. Therefore, while we prefer an uptake checker chamber, we do not confine our process to an uptake chamber, although we obtain more efficient results with an uptake checker chamber and obtain gas which has less illuminants and more methane. However, we do not claim the injection of oil into a producer broadly.

Having thus described our invention, what we claim and desire to secure by Letters Patent is:

1. A method of making oil gas mixed with producer gas in an oil carbon gas producer, which consists in maintaining a deep bed of fuel in the producer at incandescence by admission of air thereto, introducing oil periodically and successively into said producer at a plurality of fixed points above the fuel bed to thereby continuously replenish the fuel bed successively in different parts of the fuel bed by the deposition of carbon formed by the cracking and distillation of oil in producing the oil vapor and gas, and controlling the oil being deposited successively upon different parts of the fuel bed so that the fuel bed will be uniformly replenished while maintaining the optimum temperature within the producer.

2. A method of making oil gas mixed with producer gas in an oil carbon gas producer, which consists in maintaining a deep bed of fuel in the producer at incandenscence by admission of preheated air thereto, introducing oil periodically and successively into said producer through a plurality of fixed openings above the fuel bed, and controlling the introduction of oil whereby only a portion of the fuel bed will be treated at a time to thereby continuously replenish the fuel bed thereof by the deposition of carbon thereon formed by the cracking and distillation of oil in forming the oil vapor and gas, whereby the fuel bed will be replenished successively in spots without interfering with the maintenance of an optimum temperature within the producer, and thereafter delivering the gas produced to a fixing chamber.

WILLIS S. YARD.
EARL N. PERCY.